June 3, 1969

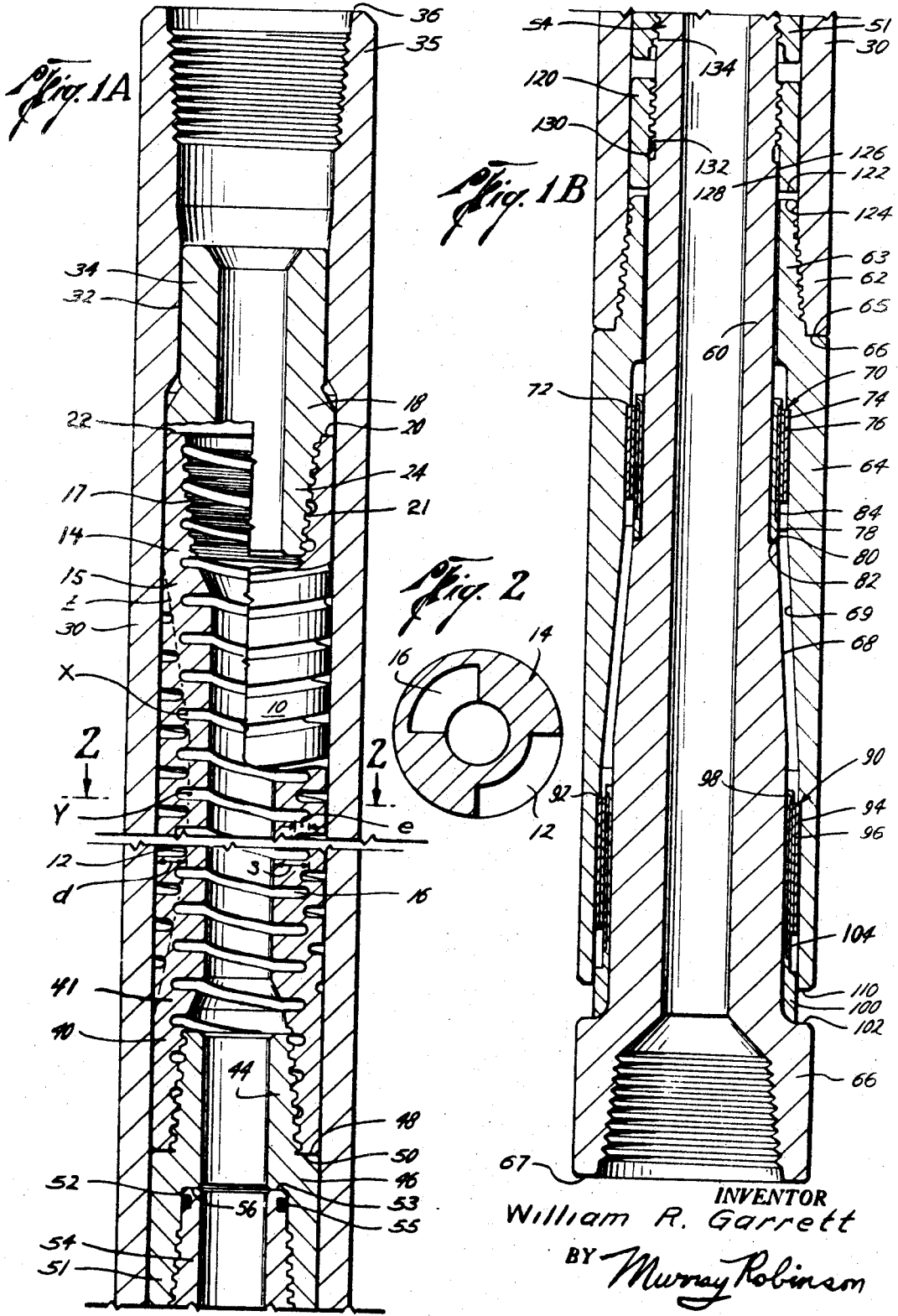

W. R. GARRETT 3,447,340

RESILIENT UNIT FOR DRILL STRINGS

Filed May 29, 1967

William R. Garrett
INVENTOR.

BY Murray Robinson
ATTORNEY

United States Patent Office 3,447,340
Patented June 3, 1969

1

3,447,340
RESILIENT UNIT FOR DRILL STRINGS
William R. Garrett, Midland, Tex., assignor to Smith Industries International Inc., a corporation of California
Filed May 29, 1967, Ser. No. 641,877
Int. Cl. F16c 1/00, 3/00; F16d 3/06
U.S. Cl. 64—1     8 Claims

ABSTRACT OF THE DISCLOSURE

An imperforate pipe having an inner helical groove staggered relative to an outer groove to form a spring pipe is provided at each end with an internally threaded box. A rigid barrel is disposed around the spring pipe. The lower ends of the pipe and barrel are releasably connected to the upper ends of inner and outer tubes of a telescopic joint provided with replaceable wear sleeves and travel limit stops. The lower end of the inner tube and the upper ends of the pipe and barrel are provided with connection means for making connection to a drill string.

Background of the invention

The invention pertains to shock absorbing, vibration dampening, resilient units for drill strings used especially in the rotary system of drilling petroleum wells.

The prior art includes applicant's own prior U.S. Patents, Numbers 3,033,011, 3,099,918, and 3,254,508.

Perhaps the closest prior art is applicant's prior Patent 3,254,508, which discloses a circularly corrugated pipe forming the spring pipe of a similar resilient unit. In that construction the convolutions of the spring pipes are circular. In constructing such a spring pipe it would be very difficult and expensive to make the pipe out of a single piece of metal because of the problem of forming the internal grooves. The alternative is a built up pipe which limits the pipe materials to those that can be welded or brazed. The finished spring pipe, whether integral or composite, is limited in its torque and axial load carrying abilities to the strength of the weakest horizontal or transverse section, usually the juncture of the innermost vertical or axially extending part of the pipe with the horizontal, or radially extending part of the pipe. The foregoing factors impose limitations on the life of a reasonably priced resilient unit as measured by the life of the spring pipe.

Summary of the invention

It has been discovered that the life and cost limitations of a resilient unit for drill strings employing a spring pipe can be overcome by using a spring pipe having helical inner and outer grooves. The helical grooves can be machined in one continuous operation from one end of the pipe to the other, which is both practical and reasonable in cost. The body of the resulting spring pipe has a horizontal cross section of constant configuration irrespective of where taken along the axis of the spring pipe, and the azimuthal position of the horizontal cross sectional configuration changes continuously progressing from one end of the body of the spring pipe to the other. At every horizontal section, some of the torque and axial load is carried by the outermost part of the spring pipe. With this helical construction applicant has found the life of the spring pipe to be increased ten times over that obtained with a construction in which the grooving of the spring was circular. The helical groove configuration of the spring pipe so greatly extends the life of the spring pipe that it is found that the telescopic joint wears out prior to the spring pipe. Some problems are met in attempting to extend the life of the telescopic joint. Even the provision of the hard surfacing on the sliding surfaces of the joint is insufficient to bring its life up to that of the helical grooved spring pipe. The problem has been solved by providing field replaceable wear sleeves on the sliding surfaces. This in itself creates a further problem due to limitations imposed by tools usually available in the field, namely, tongs and torch. Some of the parts of the unit that must be unscrewed are so far apart axially that the use of power tongs as a breakout tool is undesirable. According to the invention, threaded connections of wide spread are made with straight threads and shrink fitted so that by heating with a torch they become hand releasable. The wear sleeves are also shrink fitted in place so as to require only a torch for replacement.

Brief description of the drawing

For a detailed description of a preferred embodiment of the invention reference will now be made to the accompanying drawings wherein:

FIGURES 1A and 1B together form a side elevation, partly in section; FIGURE 2 is a section taken at plane 2—2 of FIGURE 1.

Description of preferred embodiment

Figure 3:
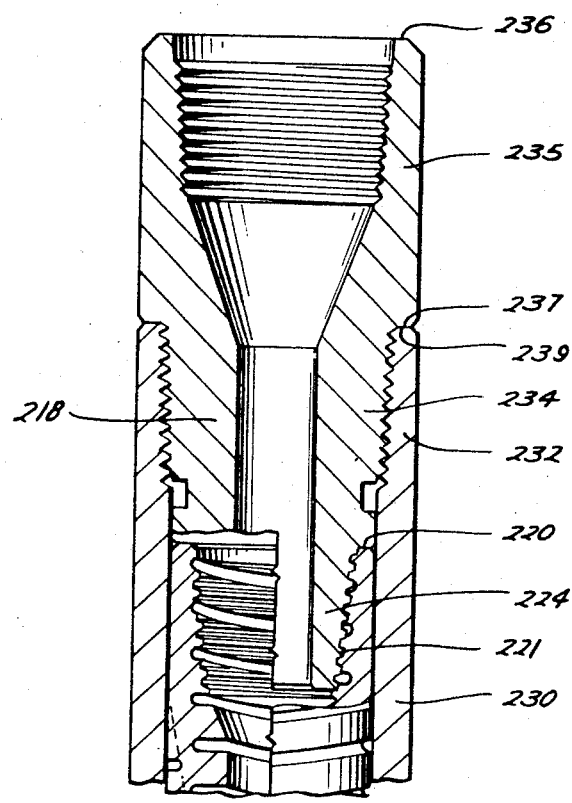
FIGURE 3 is a fragmentary view of a modification; all of the figures showing a resilient unit embodying the invention.

Referring now to the drawings there is shown a steel spring pipe 10 having an external helical groove 12 of uniform depth $d$ along the exterior of the main portion of the body of the spring pipe. At the upper end of the spring pipe the groove 12 is of gradually decreasing depth as indicated at line X beginning at Y and running out to zero depth at Z at the end of the body of the spring pipe, leaving a smooth cylindrical outer periphery at the box 14 on the end of the spring pipe.

There is a helical groove 16 inside the spring pipe extending from one end of the main body of the spring pipe to the other with a uniform depth $s$. Inner groove 16 is staggered relative to the outer groove 12 and the grooves radially overlap, that is, the inner portion of the outer groove extends inwardly beyond the outer portion of the inner groove by a distance $e$. Groove 16 continues on with the same outer diameter into box 14 at the upper end of the spring pipe, the groove running out gradually and vanishing before it reaches the mouth of box 14 due to the internal taper of the box. Transition section 15 steeply tapered internally, joins box 14 with the main body of the spring pipe.

Box 14 is internally threaded, at 17 the thread being much finer than groove 16, the thread being superimposed on the grooved tapered box. Screwed into box 14 is a sub 18 having a smooth shoulder 20 sealingly engaging the smooth flat 22 around the mouth of the box 14. An epoxy cement on thread 21 on the pin 24 of sub 18 and on thread 17 in box 14 prevents the sub from unscrewing and further seals it to the box 14.

A steel rigid barrel 30 is fitted closely about spring pipe 10, but not so close as to prevent free relative motion therebetween. For example, a nominal difference of 0.015 inch on diameters is satisfactory. Near the upper end of the barrel is a socket 32 receiving pin 34 at the upper end of sub 18. Pin 34 is held within socket 32 by a heavy shrink fit, e.g., 0.002 inch diametral interference per inch of diameter. At the upper end of the barrel is formed a tapered threaded box 35 having a smooth sealing end face 36 providing releasable means for sealingly connecting the unit to the lower end of a drill string member such as a drill collar.

The outer and inner grooves 12, 16 on the spring pipe 10 run out at the lower end of the spring pipe in a manner similar to the runout at the upper end. The inner groove 16 continues with the same outer diameter into lower box 40 but gradually vanishes due to the taper of the socket in the box. The outer groove is of gradually decreasing depth beginning near the end of the main body of the spring pipe and vanishes at the beginning of box 40. Transition section 41, steeply tapered internally, joins the main body of the spring pipe to the socket of box 40.

The tapered socket of box 40 is provided with a thread that is much finer than groove 16 and receives the threaded pin 44 of a sub 46. The threads of pin 44 and box 40 are coated with epoxy cement prior to make up to prevent them from accidentally unscrewing, and to seal the pin to the box. The smooth end 48 of the box seals with the smooth shoulder 50 on the sub. The sub 46 is provided with a tapered threaded box 51 having a smooth cylindrical land 52 and a smooth shoulder 53 at the bottom thereof adapted to receive and seal with a tapered threaded pin 54 carrying an O-ring seal 55 and having a smooth square end face 56. The pin 54 is formed at the upper end of inner tube 60 of a telescopic joint. The sub 46 including box 51 together with pin 54 provide releasable means for sealingly connecting the spring pipe to the inner tube of the telescopic joint. Similarly, tapered threaded box 62 on the lower end of barrel 30, provides releasable means to connect the lower end of the barrel to tapered threaded pin 63 on the upper end of outer tube 64 of the same telescopic joint. Box 62 has a smooth face 65 at its end adapted to seal with a smooth shoulder 66 around the root of the pin. A tapered threaded box 66 at the lower end of inner tube 60, having a sealing face 67 at the mouth thereof, provides a releaseable means for sealingly connecting the unit to the upper end of a lower drill string member such as a drill collar or drill bit, for example.

The inner tube 60 and outer tube 64 are each provided with a large diameter cylindrical sliding wear surface means and a smaller diameter cylindrical wear surface means, axially spaced apart, with tapered areas 68, 69 of gradually changing outer and inner diameter therebetween. The smaller diameter sliding wear surface means on the outer tube comprises a dual metal sleeve 70 positioned during assembly by abutment against shoulder 72 and held in place by a normal shrink fit, e.g. 0.001 diametral interference per inch of diameter. The dual metal sleeve includes an outer portion 74 of tough metal and an inner portion 76 of hard metal unitized by centrifugal casting. The smaller diameter sliding wear means on the inner tube comprises a metal sleeve 78 positioned by abutment of end 80 with shoulder 82 on tube 60 and held in place by a normal shrink fit. Sleeve 78 is exteriorly coated with hard metal 84.

Similarly, the larger diameter sliding wear surface means on the outer tube comprises a dual metal sleeve 90 positioned during assembly by abutment against shoulder 92 and held in place by a normal shrink fit, the sleeve including an outer portion 94 of tough metal and an inner portion 96 of hard metal unitized therewith. The larger diameter sliding wear means on the inner tube comprises a metal sleeve 98 positioned by abutment of end 100 with shoulder 102 on tube 60 adjacent box 66 and held in place by a normal shrink fit. Sleeve 98 is coated with hard metal 104.

Shoulder 102 on the inner tube cooperates with end face 110 on the outer tube providing stop means limiting contraction of the telescopic joint, and thus limiting contraction of the spring pipe. A ring 120 screwed onto the inner tube 60 has an end face adapted to engage end face 124 on the outer face, thereby providing stop means limiting extension of the telescopic joint and spring pipe and insuring that the unit stays together even if the spring pipe should break. Ring 120 has a smooth cylindrical inner land 126 shrink fitted on a correlative land 128 on the inner tube to hold the ring in place. The threads 130, 132 on the ring 120 and tube 60 are straight threads so that when the ring is heated, e.g. with a torch, to release the shrink fit, the ring is easily removed by hand. Since the ring must pass over the thread 134 on pin 54, the thread 132 is formed as a continuation of thread 134, even though one is straight and the other tapered.

When the sliding contact wear means on the inner and outer tubes of the telescopic joint need to be replaced, the resilient unit is parted by unscrewing the connections at box 51, pin 54 between spring pipe and inner tube, and at box 62, pin 63 between barrel and outer tube of the telescopic joint. These connections must be taken apart alternately a little at a time, first unscrewing one part way and then the other, due to the limited relative travel permitted by the stop means of the telescopic joint. They cannot be unscrewed simultaneously unless both are made with the same pitch and orientation. After the unit has thus been broken in two, the ring 120 is heated and unscrewed. The inner tube is then removed from the outer tube. The sleeves 78 and 98 on the inner tube are cut off, or heated and slipped off, and replaced. The sleeves 70 and 90 in the outer tube are cut out or the outer tube is heated enough to allow them to be slipped out, and they are then replaced. The inner tube is reassembled in the outer tube and the ring 120 is heated and screwed back onto inner tube 60. The telescopic joint is then reconnected to the spring pipe and barrel, the threads being doped with thread compound to prevent galling and insure sealing.

It is to be noted that the only threaded connections requiring tongs for breakout during the foregoing procedure are the pin 63 and box 62, and the pin 54 and box 51. The former are easily engageable exeriorly of the unit so there is no problem in break-out and make-up. The pin 54 and box 51 are not visible during either break-out or make-up. However the O-ring 55 insures an initial seal should this connection not be made up tight initially, and the normal drilling torque will fully make up the connection in short order; all of the threaded connections are right hand corresponding to the usual clockwise direction of rotary drilling. During make-up and break-out, tongs applied to box 62 on the barrel also function to hold or turn box 51 connected to the spring pipe, since the barrel and pipe are shrink fitted together at the upper end of the unit. This means that the axial spread between the tongs operating box 51 and pin 54 is only the length of the part of the telescopic joint extending down to box 64 where the inner tube becomes externally exposed. It is therefore apparent the resilient unit is well adapted for field maintenance where only the minimum of tools are available.

In use, with the resilient unit connected in the drill string, fluids and steady forces are transmitted in the conventional manner by the unit, but shocks and vibrations from the part of the string below the unit are either absorbed or transmitted to the upper part of the drill string with smaller amplitude. The unit can be used in formations where the temperature is high. The life of the unit exceeds that of the Patent 3,254,508 construction by several orders of magnitude. When the spring pipe ultimately needs to be replaced, the unit can be broken apart as in the case of sleeve replacement. The heavy shrink fit between the barrel and pin 34 can be released, e.g. by cutting off socket 32 with a torch. The spring pipe is then free and can be removed. After welding the socket back onto the barrel, or substituting a new barrel, a new spring pipe can be installed.

FIGURE 3 is a fragmentary view of the upper end of a resilient unit showing a modified construction wherein parts similar to those of the previously described embodiment bear the same reference number increased by 200. The barrel 230 is provided with a tapered threaded box 232 instead of the smooth shrink fit socket 32 of the previously described construction. Box 232 receives tapered threaded portion 234 formed on the sub 218. Sub 218 is provided at its upper end with a tapered threaded box 235 adapted for connection to an upper portion of a drill string, e.g. a drill collar. Box 235 takes the place of a box 35 on the upper end of the barrel in the previously described embodiment. Therefore barrel 230 terminates with the box 232 that receives sub 218. Box 235 is provided with a smooth end face 236 for making a releasable sealed connection with a correlative connector on the upper part of a drill string. Box 235 may be replaced by a pin if desired. This necessitates a change only in the structure of sub 218 rather than barrel 230, which is one advantage of this modified construction.

Sub 218 is provided with a smooth shoulder 237 which is adapted to seal with the smooth end face 239 at the upper end of box 232. The threaded connection between box 232 and the threaded portion 234 of sub 218 provides means that is more easily released and reassembled in the field than the heavy shrink fit 32–34 of the previously described construction. This makes it easier to replace the spring pipe in the field, which is a primary advantage of this modified construction.

While a preferred embodiment of the invention has been shown and described, many modifications thereof can be made by one skilled in the art without departing from the spirit of the invention.

I claim:

1. A spring pipe comprising a generally cylindrical metal pipe having a helical groove on the inner surface thereof coaxial with the pipe and a helical groove on the outer surface thereof coaxial with the pipe and staggered relative to the inner groove, the innermost portion of the outer groove lying closer to the axis of the pipe than the outermost portion of the inner groove.

2. A spring pipe comprising a generally cylindrical metal pipe having a helical groove on the inner surface thereof coaxial with the pipe and a helical groove on the outer surface thereof coaxial with the pipe and staggered relative to the inner groove, the innermost portion of the outer groove lying closer to the axis of the pipe than the outermost portion of the inner groove, the inner groove extending the full length of the pipe, the pipe being provided with outwardly flaring, tapered, threaded sockets at each end into which the inner groove vanishes, each of the sockets having a thread finer than the inner groove, the outer groove being of gradually reducing depth near said sockets and terminating adjacent the bottom of each socket.

3. In a resilient unit including a barrel,
a spring pipe inside the barrel,
one end of the barrel being connected to one end of the spring pipe,
a telescopic joint including an inner tube and an outer tube and means limiting relative extension and contraction of the joint,
one end of the outer tube being connected to the other end of the barrel and one end of the inner tube being connected to the other end of the spring pipe,
the other end of said inner tube being provided with connector means for making connection with a drill string member, and
connector means at the end of said resilient unit nearest said one end of said barrel for making connection with a drill string member,
the improvement wherein said spring pipe is formed with staggered inner and outer radially overlapping helical grooves, each groove extending continuously more than 360 degrees around the pipe axis.

4. A resilient unit including a barrel,
a spring pipe inside the barrel,
one end of the barrel being connected to one end of the spring pipe,
a telescopic joint including an inner tube and an outer tube,
one end of the outer tube being connected to the other end of the barrel and one end of the inner tube being connected to the other end of the spring pipe,
the other end of said inner tube being provided with connector means for making connection with a drill string member,
connector means at the end of said resilient unit nearest said one end of said barrel for making connection with a drill string member,
said spring pipe being formed with staggered inner and outer radially overlapping grooves,
said connections between said barrel and outer tube and between said spring pipe and inner tube being releasable,
stop means on said inner tube adjacent said other end of the inner tube,
stop means releasably secured on said inner tube adjacent said one end of said inner tube,
said outer tube including portions cooperable with said stop means thereby limiting contraction and expansion of said telescopic joint [as aforesaid],
wear sleeve means releasably held on said outer tube, and
wear sleeve means releasably held on said inner tube disposed between said stop means and cooperative with said wear sleeve means on said outer tube.

5. A resilient unit including a barrel,
a spring pipe inside the barrel,
one end of the barrel being connected to one end of the spring pipe,
a telescopic joint including an inner tube and an outer tube and means limiting relative extension and contraction of the joint,
one end of the outer tube being connected to the other end of the barrel and one end of the inner tube being connected to the other end of the spring pipe,
the other end of said inner tube being provided with connector means for making connection with a drill string member,
connector means at the end of said resilient unit nearest said one end of the said barrel for making connection with drill string member,
said spring pipe being formed with staggered inner and outer radially overlapping grooves,
said connection between said barrel and outer tube including a tapered threaded pin and a tapered threaded box,
the pin having a shoulder around the root of the pin adapted to seal with the mouth of the box,
said connection between said spring pipe and inner tube being shielded from view by said barrel and outer tube when connected,
said connection between said spring pipe and inner tube including a tapered threaded pin and a tapered threaded box,
the last said box having a shoulder at the bottom thereof adapted to seal with the end of the last said pin,
the last said pin having a cylindrical end carrying a seal ring adapted to seal with a correlative cylindrical area in the last said box even when the last said pin and box are not fully engaged.

6. A resilient unit comprising
a generally cylindrical metal pipe having a helical groove on the inner surface thereof coaxial with the pipe and a helical groove on the outer surface of the pipe coaxial with the pipe and staggered relative to the inner groove the innermost portion of the outer groove lying closer to the axis of the pipe than the outermost portion of the inner groove, said inner groove extending the full length of the pipe, and connector means screwed into each end of the pipe for making connection with a drill string.

7. Combination according to claim 6 wherein said connector means at one end of the pipe includes
a sub having at one end a threaded pin screwed into said one end of the pipe, said sub having at its other end an unthreaded pin, and a barrel around said pipe shrink fitted near one end of the barrel to said unthreaded pin, said barrel having threaded means at said one end adapted for connection to a drill string.

8. Combination according to claim 6 wherein said connector means at one end of the pipe includes a sub having at one end a stepped threaded pin including one portion screwed into said one end of the pipe and a larger diameter portion extending beyond said end of the pipe, said larger diameter portion having a diameter larger than the outer diameter of said pipe and carrying a barrel screwed thereto and extending around said pipe, said sub having at its other end threaded means adapted for connection to a drill string.

References Cited

UNITED STATES PATENTS

| | | | |
|---|---|---|---|
| 2,246,418 | 6/1941 | Froome et al. | 175—323 |
| 2,449,841 | 9/1948 | Claypool et al. | 175—321 |
| 3,033,011 | 5/1962 | Garrett | 64—23 X |
| 3,254,508 | 6/1966 | Garrett | 64—1 |
| 3,263,446 | 8/1966 | Wiggins | 64—15 |
| 3,274,798 | 9/1966 | Wiggins | 64—1 |
| 3,350,900 | 11/1967 | Harrison | 64—23 |

HALL C. COE, *Primary Examiner.*

U.S. Cl. X.R.

64—23; 175—321